United States Patent [19]

Goffredi et al.

[11] 4,385,919

[45] May 31, 1983

[54] METHOD OF FORMING A VIAL BLOWBACK CAVITY

[75] Inventors: Albert S. Goffredi, Vineland; John E. Lisi; Ralston G. Edwards, Jr., both of Newfield, all of N.J.

[73] Assignee: Owens-Illinois, Inc., Toledo, Ohio

[21] Appl. No.: 280,439

[22] Filed: Jul. 6, 1981

[51] Int. Cl.³ .............................................. C03B 23/09
[52] U.S. Cl. ........................................ 65/109; 65/296; 65/297; 65/298
[58] Field of Search .................. 65/109, 296, 297, 298

[56] References Cited

U.S. PATENT DOCUMENTS

| | | | |
|---|---|---|---|
| 3,202,495 | 8/1965 | Zauner | 65/296 X |
| 3,257,186 | 6/1966 | Zauner | 65/296 X |
| 3,360,352 | 12/1967 | Sundstrom et al. | 65/109 |

*Primary Examiner*—Arthur D. Kellogg
*Attorney, Agent, or Firm*—Richard D. Heberling; Myron E. Click; David H. Wilson

[57] ABSTRACT

A method of forming a blowback cavity in a vial or similar cylindrical article comprises the steps of providing a cylindrical glass preform having a necked region and first forming an open blowback cavity adjacent the necked region and a relatively thin axially projecting terminal lip on the adjacent end of the preform and subsequently turning the terminal lip inwardly to form a radially extending face defining a mouth opening having a diameter smaller than the diameter of the blowback cavity.

13 Claims, 6 Drawing Figures

METHOD OF FORMING A VIAL BLOWBACK CAVITY

BACKGROUND OF THE INVENTION

The invention relates to methods of forming finishes on thermoplastic articles and more particularly to a method of forming mouth adjacent cavities known as blowback cavities in glass vials and similar articles.

The production of small articles from thermoplastic materials, such as vials and ampoules from glass is a production task performed almost solely by automatic machines. Lengths of tubular glass preforms are heated, separated into appropriate lengths, sealed at one end and have an appropriate finish formed on the other. Machine art in this area is well developed and is exemplified by U.S. Pat. Nos. 3,171,730, 3,424,570, 3,792,991 and 4,080,189.

Whereas the formation of a reduced, uniform diameter opening in a vial may be readily fabricated by means of a smooth walled mandrel inserted thereinto, aluminum seal vials having syringe puncturable elastomeric inserts require the disposition of a large diameter cavity intermediate two smaller diameter regions to receive and retain the insert. Such a cavity is commonly denominated a blowback cavity. A correspondingly configured solid mandrel is obviously incapable of forming such an enlarged diameter cavity.

One prior art apparatus capable of fabricating such a cavity is disclosed in co-owned U.S. Pat. No. 3,202,495. Here, expandable mandrel segments are inserted into the mouth of a rotating vial and expanded to tool the desired cavity adjacent the mouth opening. When the tooling of the cavity has been completed, the mandrel segments are collapsed and removed from the vial. This method of fabrication is, however, somewhat slow in that the vial must be properly registered and rotated, the mandrel segments collapsed in order to enter the vial mouth, expanded to form the blowback cavity and finally collapsed in order to exit the vial.

As those generally familiar with machines which fabricate articles by a sequence of steps will readily appreciate, the overall fabrication rate is limited by the rate or time of the slowest step. In glass vial fabricating machines, this step typically has been associated with the formation of a blowback cavity. A method which both simplifies and speeds the formation of a blowback cavity in a vial or similar article would therefore be desirable.

SUMMARY OF THE INVENTION

The invention method includes steps in which the finish and specifically the mouth adjacent cavity of a vial known as a blowback cavity is formed by first tooling an open blowback cavity and a vial finish having a relatively thin axially projecting terminal lip portion and subsequently turning this lip portion inwardly to form a radially extending face defining a mouth having a diameter smaller than the diameter of the blowback cavity. Two sets of solid mandrels and external tooling dies are utilized.

In accordance with conventional vial production practice, elongate, hollow glass preforms, typically tubes, are utilized to fabricate the vials. Similarly, conventional vial fabrication techniques are utilized to preform by rotating, heating and tooling the cylindrical vial wall into generally necked and conically flared regions. The steps of the method include applying additional heat generally to the necked and flared open end of the rotating glass preform and applying a first set of tools to the heated, rotating preform to more accurately form the neck, shoulder and finish region of the vial. Specifically, a blowback cavity having a diameter larger than the neck diameter of the vial and a relatively thin, axially projecting terminal lip portion are formed in the vial wall. The first set of tools includes a solid, stepped, circular mandrel and a die. Next, the previously formed terminal lip portion only is heated. Finally, a second set of tools is applied to the rotating vial to roll the previously formed axially extending terminal lip portion inwardly to form the mouth of the vial as well as define the end wall of the blowback cavity. This second set of tools includes a solid, circular mandrel and a tooling die.

Since the instant method utilizes solid mandrels rather than segmented mandrels which must be cycled after placement within the vial finish to first expand to form a blowback cavity and then collapse to allow removal, the total time required to form and tool the finish and blowback cavity of a vial is significantly reduced over prior art methods. In fact, the time required to perform this step is typically reduced by about one-half. As previously noted, the vial and blowback formation steps are often the production rate limiting aspects of vial fabricating equipment. Practice of the instant invention thus readily and typically increases production rates by a corresponding factor of about two.

Thus it is an object of the instant invention to provide a method of forming and tooling mouth adjacent cavities in small cylindrical articles.

It is a further object of the instant invention to provide a method of forming blowback cavities in glass vials.

It is a still further object of the instant invention to provide a method of forming and tooling blowback cavities in glass vials which utilizes solid mandrels.

It is a still further object of the instant invention to provide a method of forming and tooling blowback cavities in glass vials which permits significantly increased production rates.

Further objects and advantages of the instant invention will become apparent by reference to the following Description of the Preferred Embodiment and appended drawings.

DESCRIPTION OF THE PREFERRED EMBODIMENT

Figure 1:
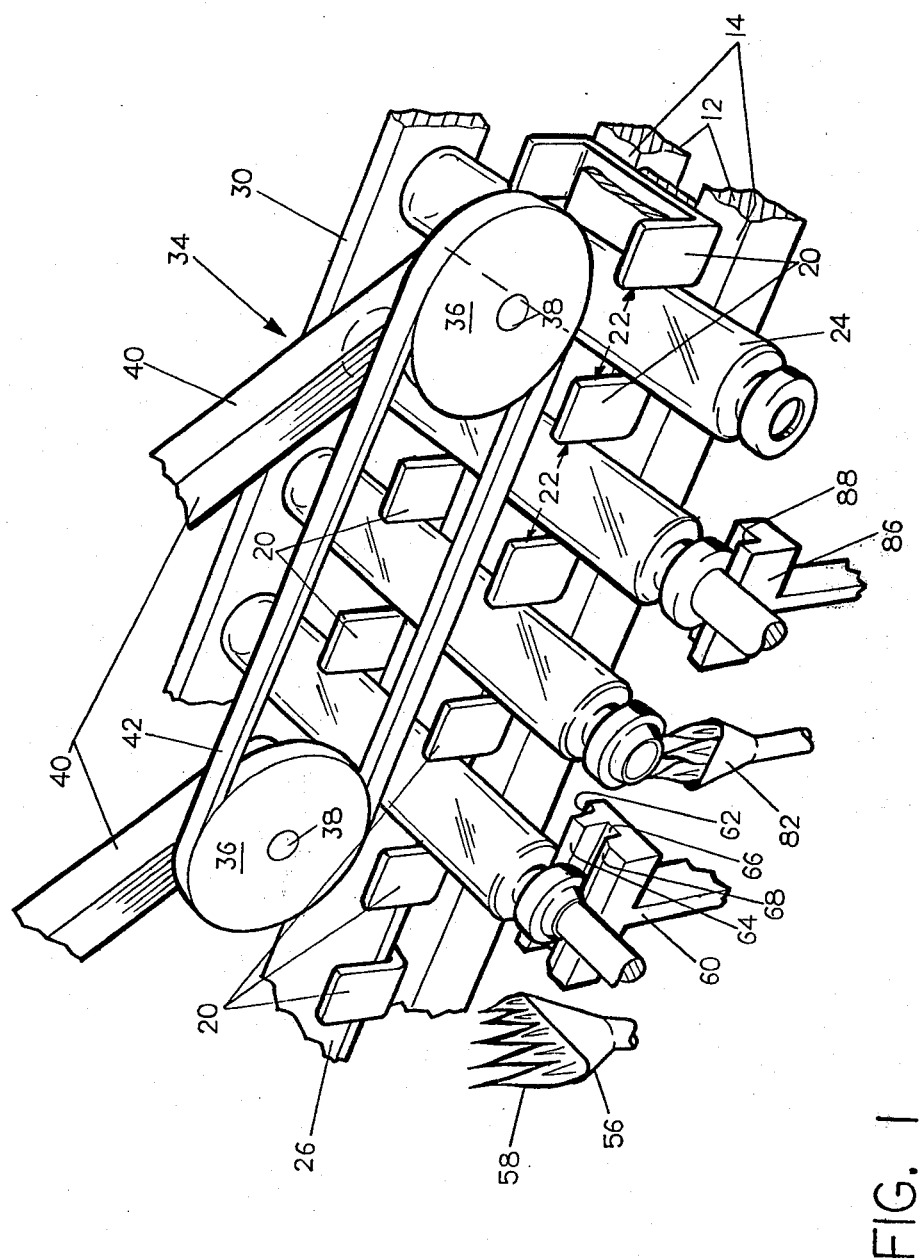
FIG. 1 is a fragmentary perspective view of a portion of a production line for cylindrical articles such as glass vials in which the instant invention is practiced.

Referring now to FIG. 1, a portion of a production line for the fabrication of glass vials and similar articles in which the instant invention is practiced is illustrated and generally designated by the reference numeral 10. The production line 10 includes a longitudinally extending pair of spaced-apart support beams 12. The support beams 12 are maintained in appropriate position by additional support structures (not illustrated) and include an upper smooth surface 14. Disposed for longitudinal translation in the interstice between the support beams 12 is an endless flexible drive band 16. The drive band 16 typically extends the length of the support beams 12 and engages, in at least one location, a drive means (not illustrated) which provides energy to cause the circulation of the drive band 16. Secured to the drive band 16 at spaced-apart intervals therealong and disposed on the upper surfaces 14 of the beams 12 for longitudinal translation are a plurality of lugs 20. The lugs 20 are disposed transversely on the drive band 16 and secured thereto by suitable fastening means (not illustrated). The lugs 20 are spaced-apart longitudinally and define interstices 22 within which cylindrical articles such as glass vials 24 may be received. An endless flexible drive belt 26 is disposed between the lugs 20 and extends longitudinally, generally coextensively, with the drive band 16. At at least one location, the drive belt 26 engages a drive means (not illustrated) for providing energy thereto to cause circulation of the drive belt 26 at a velocity distinct from the velocity imparted to the lugs 20 by the drive band 16. The translation of the drive belt 26 rotates the cylindrical articles 24 which are restrained by the lugs 20. A longitudinally extending backstop 30 extends generally along the full length of the support beams 12 and provides a reference plane against which one end of the articles 24 may abut.

The production line 10 further includes an auxiliary drive assembly 34 which is disposed in general longitudinal alignment with the beams 12. The auxiliary drive assembly 34 preferably includes a pair of pulleys 36 which are rotatably disposed on a pair of suitably spaced-apart shafts 38 which are in turn supported for rotation within suitable support members 40. A drive means (not illustrated) provides rotational energy to at least one of the shafts 38 and pulleys 36 and thus causes circulation of a belt 42 disposed thereabout. The linear surface speed of the belt 42 is preferably substantially equal to the surface speed of the drive belt 26. The direction of travel of the portion of the belt 42 which engages the cylindrical articles 24 must, however, be in the direction opposite to that of the drive belt 26 in order to properly encourage their rotation. The drive assembly 34 is disposed coincidently with that portion of the production line 10 at which the instant invention is to be practiced. The vials 24 are gripped between and constantly rotated by the drive belt 26 and the belt 42 of the auxiliary drive assembly 34 as they translate along such just referenced portion of the production line 10.

The specific steps of the instant method as well as the tooling required to perform it will now be described. For purposes of example and illustration only, it will be assumed that the vials 24 translate from left to right as viewed in FIG. 1. As noted previously, the instant invention utilizes prior art vial formation equipment techniques to prepare the tubular glass stock in order that the instant invention might be practiced. Specifically, such steps include opening the end of the circular stock if it has been closed and with one, two or more steps form it into a rough approximation of the necessary vial finish.

Figure 2:
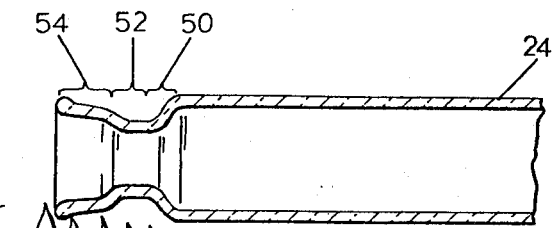
FIG. 2 is a fragmentary sectional view of an article such as a glass vial undergoing a heating step prior to blowback cavity formation according to the instant invention.

Such a rough approximation is illustrated in FIG. 2. The vial 24 illustrated in FIG. 2 has undergone various preliminary prior art cutoff and forming steps and generally defines a curved shoulder region 50, a substantially constant diameter neck region 52 and a flared, conical finish region 54. Heat is applied to the regions 50, 52 and 54 by a gas burner 56 or other suitable means in generally inverse proportion to the relative distance of the region from the end of the vial 24, i.e., the finish region 54 of the vial 24 has the greatest amount of heat applied whereas the shoulder region 50 has the least amount of heat applied. The height of a gas flame 58 emanating from the burner 56 schematically illustrates this relationship. Sufficient quantities of heat are supplied to the regions 50, 52 and 54 of the vial 24 in order to make the material from which it is fabricated plastic and workable.

Figure 3:
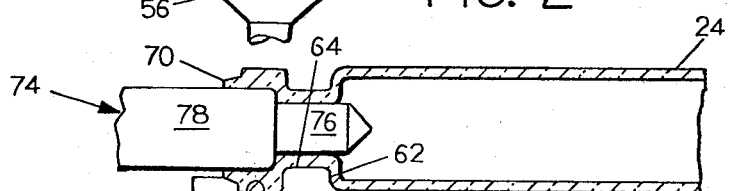
FIG. 3 is a fragmentary sectional view of an article such as a glass vial undergoing the first tooling step according to the instant invention.

The glass vial 24 is now advanced longitudinally to the first tooling station of the instant method invention which is illustrated in FIGS. 1 and 3. At the first tooling station, a first stationary tooling die 60 engages one of the vials 24. The first tooling die 60 defines a first curved, longitudinally extending surface 62 which further forms the shoulder region 50 of the vial 24. The curved surface 62 is disposed immediately adjacent a flat longitudinally extending surface 64 which further forms the neck region 52 of the vial 24. The intersection of the surfaces 62 and 64 is substantially a right angle. The first tooling die 60 further defines a longitudinally extending channel 66 having substantially perpendicular walls. The channel 66 further forms the finish region 54 of the vial 24. Finally, the die 60 defines an inclined longitudinally extending surface 68 disposed adjacent the U-shaped channel 66. The inclined surface 68 preforms an axially extending terminal lip portion 70 in the finish region 54 of the vial 24. While the rotating vial 24 is in contact with the first tooling die 60, a stationary stepped mandrel 74 is inserted into the vial 24. The mandrel 74 includes a smaller diameter portion 76 which extends somewhat beyond the shoulder region 50 of the vial 24 and defines generally the inside diameter of this region as well as the inside diameter of the neck region 52. The stepped mandrel 74 also includes a larger diameter portion 78 which defines a correspondingly larger inside diameter region or blowback cavity 80 in the finish region 54 of the vial 24. The mandrel 74 must, of course, be translated longitudinally with the vial 24 as it moves along the beams 12. Such longitudinal translation may be readily accomplished by various means well known in the art. At the completion of the tooling just described, the mandrel 74 is removed from the vial 24 and the vial 24 passes to an additional heat application step.

Figure 4:
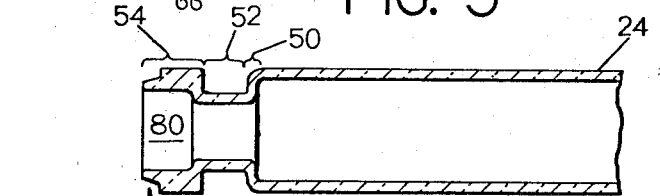
FIG. 4 is a fragmentary sectional view of an article such as a glass vial undergoing an additional heating step according to the instant invention.

The additional heat application step is illustrated in FIGS. 1 and 4. Here, again while being rotated, heat is applied by a gas burner 82 or similar means to the axially extending terminal lip portion 70 of the finish region 54 of the vial 24. The quantity of heat applied is preferably carefully adjusted such that substantially only the axially extending lip portion 70 of the finish region 54 becomes plastic. FIG. 4 also clearly illustrates the mouth adjacent blowback cavity 80.

Figure 5:
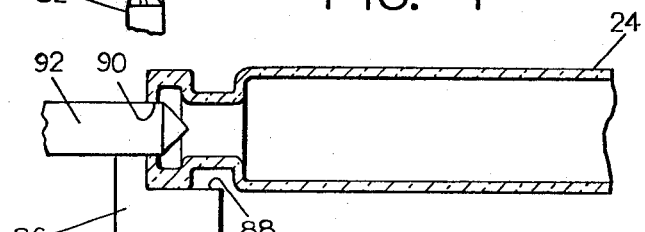
FIG. 5 is a fragmentary sectional view of an article such as a glass vial undergoing the second tooling step according to the instant invention.

The final tooling step of the invention is illustrated in FIGS. 1 and 5. The vial 24 now translates into juxtaposition with a second tooling die 86. The tooling die 86 defines a longitudinally extending, perpendicularly oriented pair of planar surfaces 88. The planar surfaces 88 roll the axially extending terminal lip portion 70 radially inwardly to form a mouth opening 90. Simultaneously with the arrival of the vial 24 at the second tooling die 86, a cylindrical mandrel 92 is inserted into the vial 24 to ensure that as the lip portion 70 is rolled inwardly, the resulting opening, i.e., the mouth opening 90, is circular. The cylindrical mandrel 92 must, in a fashion similar to the stepped mandrel 74, be translated longitudinally with the vial 24 while it is inserted therein.

Figure 6:
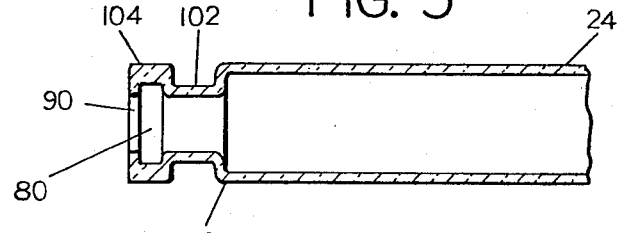
FIG. 6 is a fragmentary view of a glass vial or a similar article having a blowback cavity fabricated according to the instant invention.

The vials 24 illustrated to the right in FIG. 1 and in FIG. 6 illustrate vials 24 fabricated according to the instant method. The vials 24 include a well defined shoulder 100, a sharply defined neck 102 and a similarly sharply defined finish 104. Within the finish 104 is disposed the blowback cavity 80 which communicates with the directly adjacent mouth opening 90 and the interior of the vial 24.

The foregoing disclosure is the best mode devised by the inventors for practicing this invention. It is apparent, however, that methods incorporating modifications and variations will be obvious to one skilled in the art of vial fabrication. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A method of forming a mouth adjacent cavity in a cylindrical article, comprising the steps of:
    providing cylindrical stock having a reduced diameter region adjacent one end of such cylindrical stock,
    rotating such cylindrical stock,
    applying heat to such one end and such reduced diameter region of such cylindrical stock,
    forming an enlarged diameter region adjacent such reduced diameter region and an axially extending terminal lip by inserting a stepped mandrel into such one end and such reduced diameter region and applying a first external die to such one end and such reduced diameter region,
    applying heat to such axially extending terminal lip, and
    rolling such axially extending terminal lip inwardly by inserting a mandrel generally into such enlarged diameter portion and applying a second external die to such lip.

2. The method of claim 1 wherein heat applied to such one end and such reduced diamter region is generally applied to a given location in inverse proportion to the distance of such location from the adjacent terminus of such stock.

3. The method of claim 1 wherein such stepped mandrel and such first external die are applied substantially simultaneously to such cylindrical stock.

4. The method of claim 1 wherein such mandrel and such second external die are applied substantially simultaneously to such cylindrical stock.

5. A method of forming a mouth adjacent cavity in a cylindrical article, comprising the steps of:
    providing cylindrical stock having a flared end adjacent region and a reduced diameter region adjacent said flared region,
    rotating said cylindrical stock,
    applying heat to said flared region and said reduced diameter region of said cylindrical stock,
    forming an enlarged diameter region adjacent said reduced diameter region and an axially extending terminal lip by inserting a stepped mandrel into said flared region and said reduced diameter region and applying a first external die to said flared and said reduced diameter regions,
    applying heat to said axially extending terminal lip, and
    rolling said axially extending terminal lip inwardly by inserting a mandrel generally into said enlarged diameter portion and applying a second external die to said lip.

6. The method of claim 5 wherein heat applied to said flared region and said reduced diameter region of said cylindrical stock is applied to a given location generally in inverse proportion to the distance of said location from the adjacent end of said cylindrical stock.

7. The method of claim 5 wherein said stepped mandrel and said first external die are applied substantially simultaneously to said cylindrical stock.

8. The method of claim 5 wherein said mandrel and said second external die are applied substantially simultaneously to said cylindrical stock.

9. The method of claim 5 wherein said axially extending terminal lip as first formed is generally triangular in cross-section.

10. A method of forming a mouth adjacent cavity in a cylindrical article, comprising the steps of:
    providing cylindrical stock having a flared end adjacent region and a reduced diameter region adjacent said flared region,
    rotating said cylindrical stock,
    applying heat to said flared region and said reduced diameter region of said cylindrical stock,
    forming an enlarged diameter region adjacent said reduced diameter region and an axially extending terminal lip by substantially simultaneously inserting a stepped mandrel into said flared region and said reduced diameter region and applying a first external die to said flared and said reduced diameter regions,
    applying heat to said axially extending terminal lip, and
    rolling said axially extending terminal lip inwardly by substantially simultaneously inserting a mandrel generally into said enlarged diameter portion and applying a second external die to said lip.

11. A method of forming a mouth adjacent cavity in a cylindrical glass article comprising the steps of:
    providing a cylindrical glass stock having a reduced diameter region adjacent one end of such cylindrical stock, and rotating such cylindrical stock;
    applying heat to such one end and such reduced diameter region of such cylindrical stock;
    forming an axially extending terminal lip with excess glass at the one end of the stock;
    applying heat to the axially extending terminal lip; and
    rolling such axially extending terminal lip with excess glass axially inwardly by rotating the heated lip over an external die with a solid die surface that forces the heated glass inwardly to provide a blowback cavity at the end of the stock.

12. A method of forming a mouth adjacent cavity in a cylindrical glass tube stock, the stock being continuously moved in a generally horizontal plane as part of a line of a plurality of tube stocks, the method comprising the steps of:
   applying heat to one end of the stock having a reduced diameter region;
   heating the end of the stock while continuing to rotate the stock;
   forming at the reduced end of the stock an axially extending terminal lip with excess glass by rotating the heated end over a first external die and simultaneously inserting a first translating mouth plug into the mouth of the stock;
   applying heat to the terminal lip; and
   rolling the terminal lip inwardly axially by rotating the lip against a solid die surface of a fixed second external die and simultaneously inserting a second translating mouth plug into the mouth of the stock to form a glass vial with a blowback cavity.

13. A method of forming a mouth adjacent cavity in a hollow glass tube stock having a reduced diameter end, a plurality of the stocks being continuously transported in a generally horizontal plane and each stock being rotated, the method comprising the steps of:
   applying a stepped mandrel internally of a heated end portion of the stock adjacent to a reduced diameter to expand the tubular end portion in forming an axially extending terminal lip with excess glass by rotating the stock over the stepped mandrel;
   heating the terminal lip portion; and
   rolling the heated lip portion axially inwardly by rotating the heated end lip over an external die having a die surface that forces the heated glass inwardly to form a partially closed blowback cavity on the end of the tubular article.

* * * * *